United States Patent [19]

Wunning et al.

[11] Patent Number: 5,201,296
[45] Date of Patent: Apr. 13, 1993

[54] CONTROL SYSTEM FOR AN INTERNAL COMBUSTION ENGINE

[75] Inventors: John J. Wunning, Peoria; Errol W. Davis, Chillicothe; Larry E. Schmidt, Peoria; Ronald J. Penick, Peoria; Mohamad Z. Deiri, Peoria; Paul M. Young, Peoria, all of Ill.

[73] Assignee: Caterpillar Inc., Peoria, Ill.

[21] Appl. No.: 860,657

[22] Filed: Mar. 30, 1992

[51] Int. Cl.$^5$ .................... F01L 9/04; F02D 43/04; F02D 41/22
[52] U.S. Cl. .................... 123/479; 123/90.11; 123/478; 364/431.11
[58] Field of Search .......... 123/90.11, 478, 479, 123/480; 364/431.05, 431.11

[56] References Cited

U.S. PATENT DOCUMENTS

| | | | |
|---|---|---|---|
| 3,501,099 | 3/1970 | Benson | 239/535 |
| 3,682,152 | 8/1972 | Muller-Berner | 123/90.11 |
| 3,935,846 | 2/1976 | Zelenka | 123/90.11 X |
| 4,009,695 | 3/1977 | Ule | 123/90.13 |
| 4,176,624 | 12/1979 | Bielecki et al. | 123/90.11 |
| 4,368,705 | 1/1983 | Stevenson | 123/357 |
| 4,392,459 | 7/1983 | Chareire | 123/21 |
| 4,535,743 | 8/1985 | Igashira et al. | 123/472 |
| 4,593,658 | 6/1986 | Moloney | 123/90.11 |
| 4,628,881 | 12/1986 | Beck et al. | 123/447 |
| 4,641,613 | 2/1987 | Delesalle | 123/179.21 |
| 4,700,684 | 10/1987 | Pischinger et al. | 123/568 |
| 4,785,784 | 11/1988 | Nanyoshi et al. | 123/478 |
| 4,945,870 | 8/1990 | Richeson | 123/90.11 |
| 5,005,539 | 4/1991 | Kawamura | 123/21 |
| 5,022,357 | 6/1991 | Kawamura | 123/90.11 |
| 5,117,790 | 6/1992 | Clarke et al. | 123/321 |

OTHER PUBLICATIONS

Proposal for Magnavox Electronic Valve System, published Nov. 15, 1988, Ser. No. MX-18-145.

Primary Examiner—Tony M. Argenbright
Attorney, Agent, or Firm—David M. Masterson

[57] ABSTRACT

A control system for an internal combustion engine having a plurality of cylinders and a rotatable crankshaft. Each cylinder has an electronically actuatable intake valve, exhaust valve and fuel injector. The control system includes a sensor which monitors the rotation of the crankshaft and responsively produces a crankshaft pulsetrain. A computer produces operator parameter signals. The operator parameter signals including one of a plurality of operating modes of the engine. A first microprocessor receives the crankshaft pulsetrain, responsively determines the speed of the engine and produces a signal representative of the determined engine speed. A second microprocessor receives the operator parameter signals and the engine speed signal, responsively determines valve and injection events for each cylinder to responsively achieve the one engine operating mode. The second microprocessor produces signals representative of the determined valve and injection events.

11 Claims, 13 Drawing Sheets

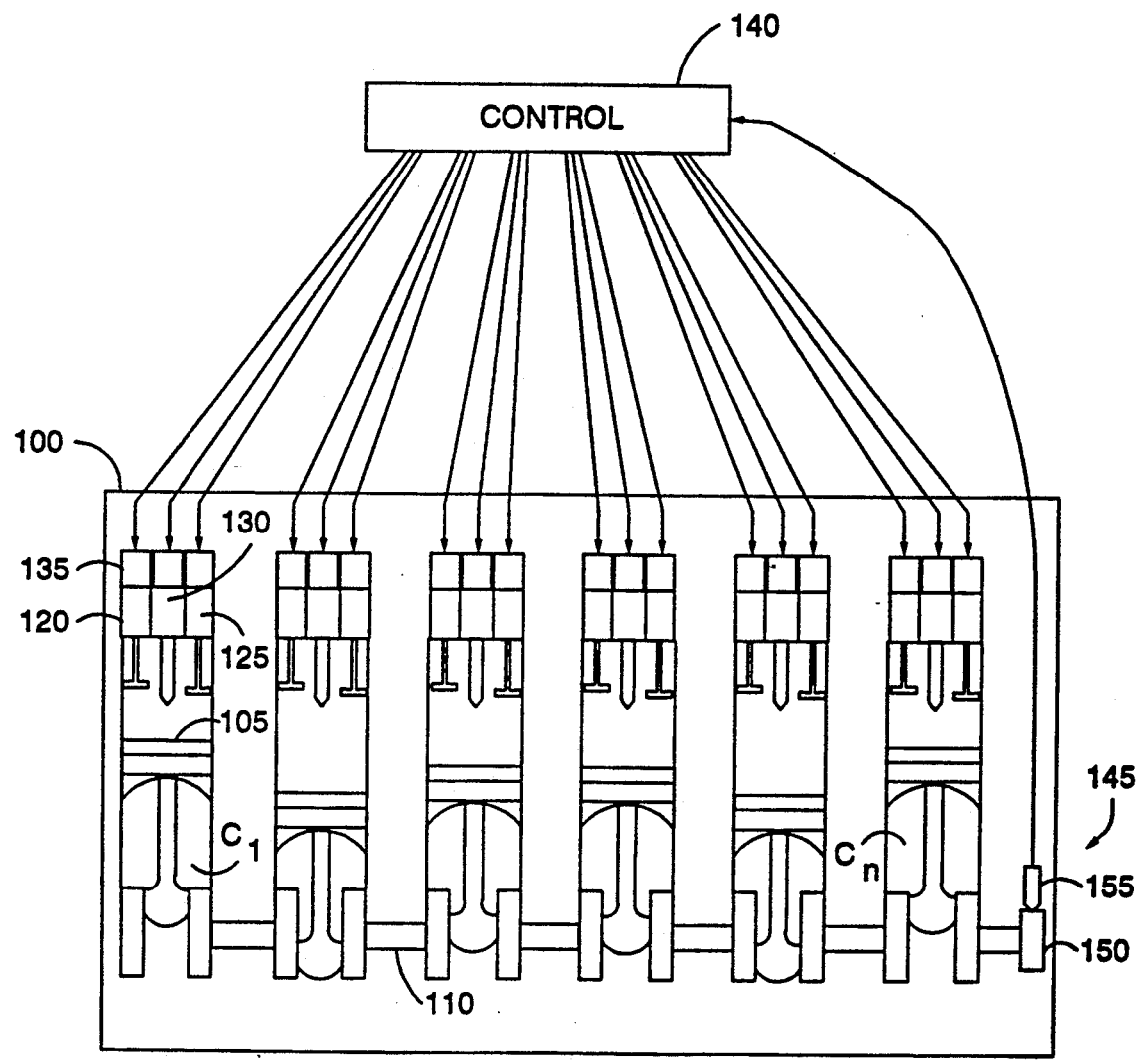
Fig_1

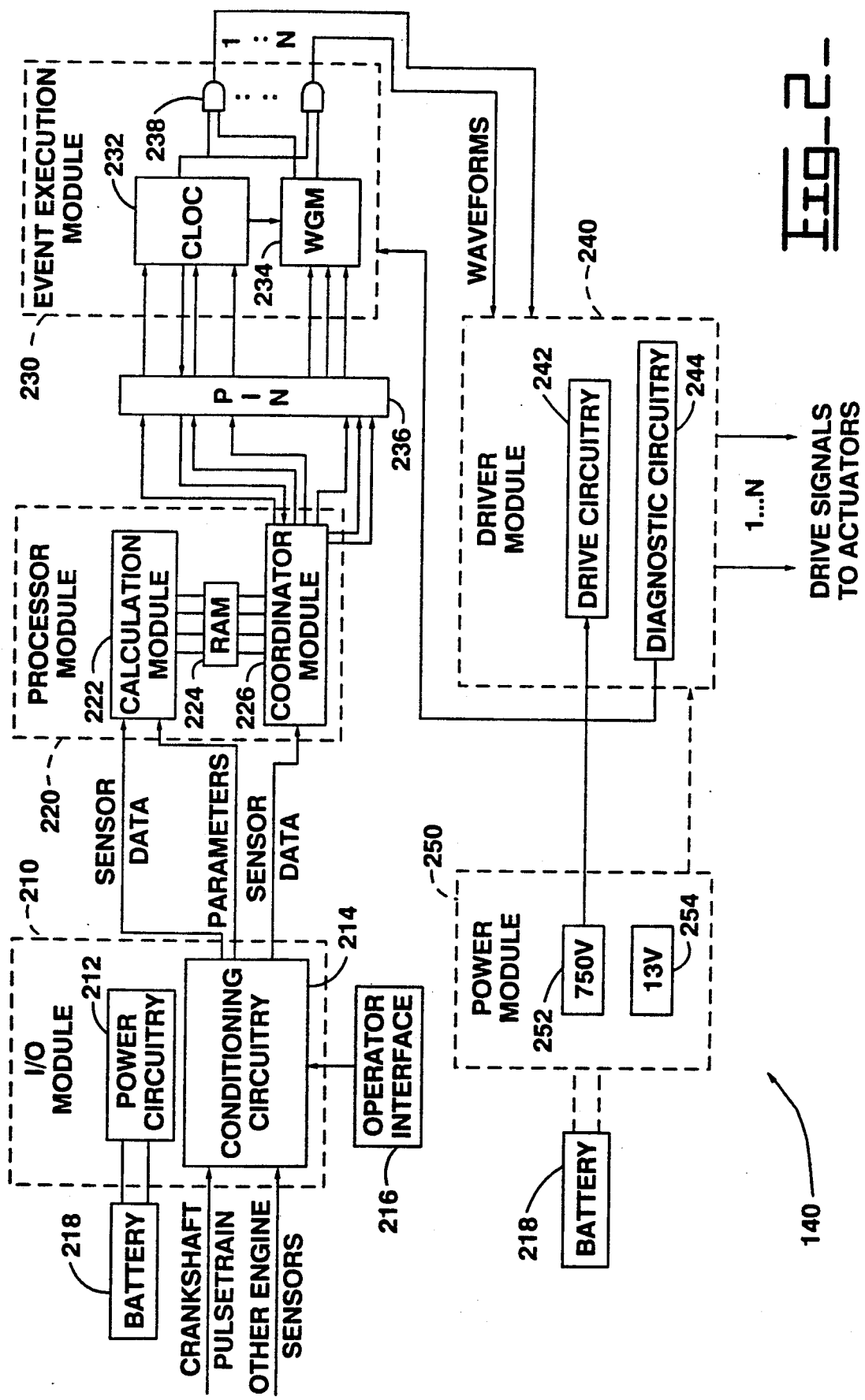

VALVE OPERATION  Fig_3A_
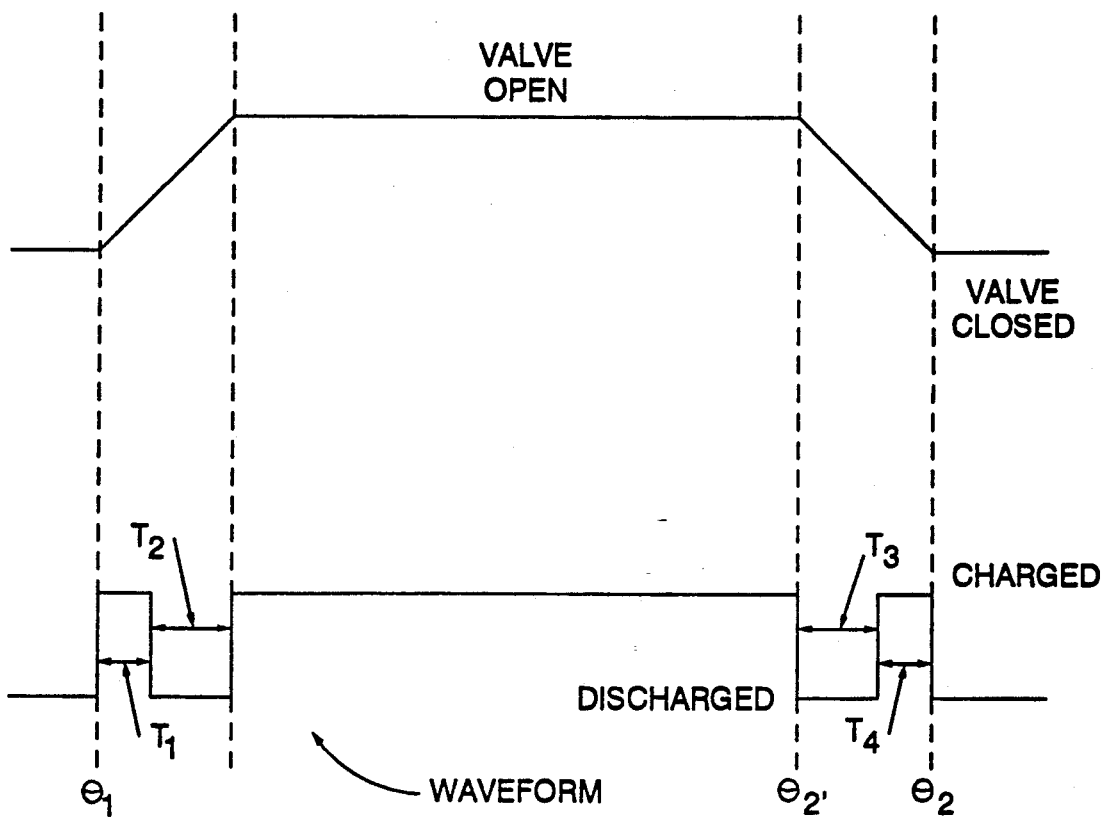
Fig_3B_
FUEL INJECTION OPERATION
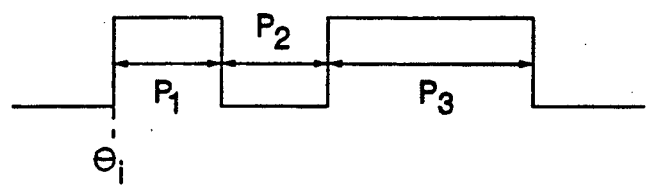
Fig_3C_

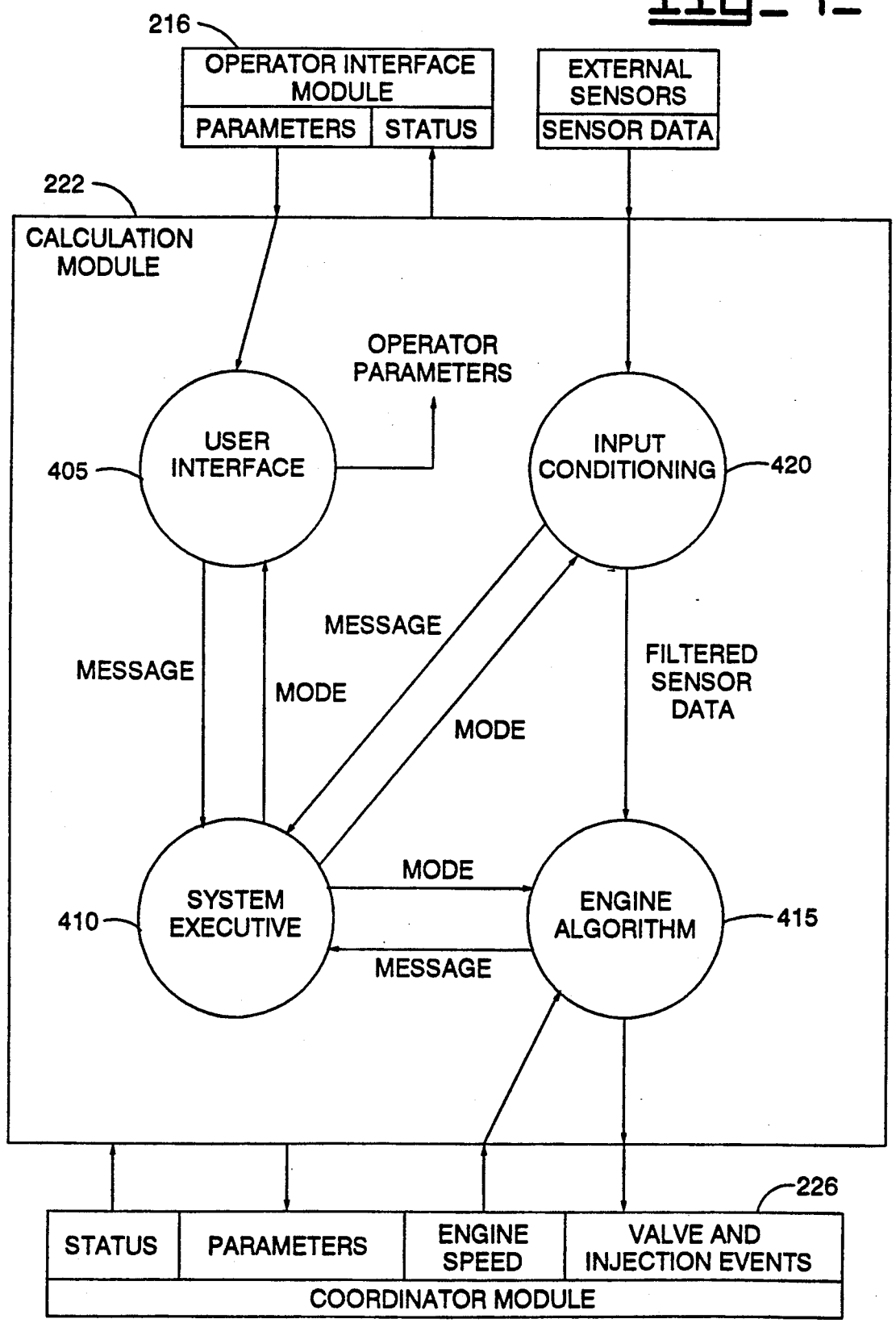

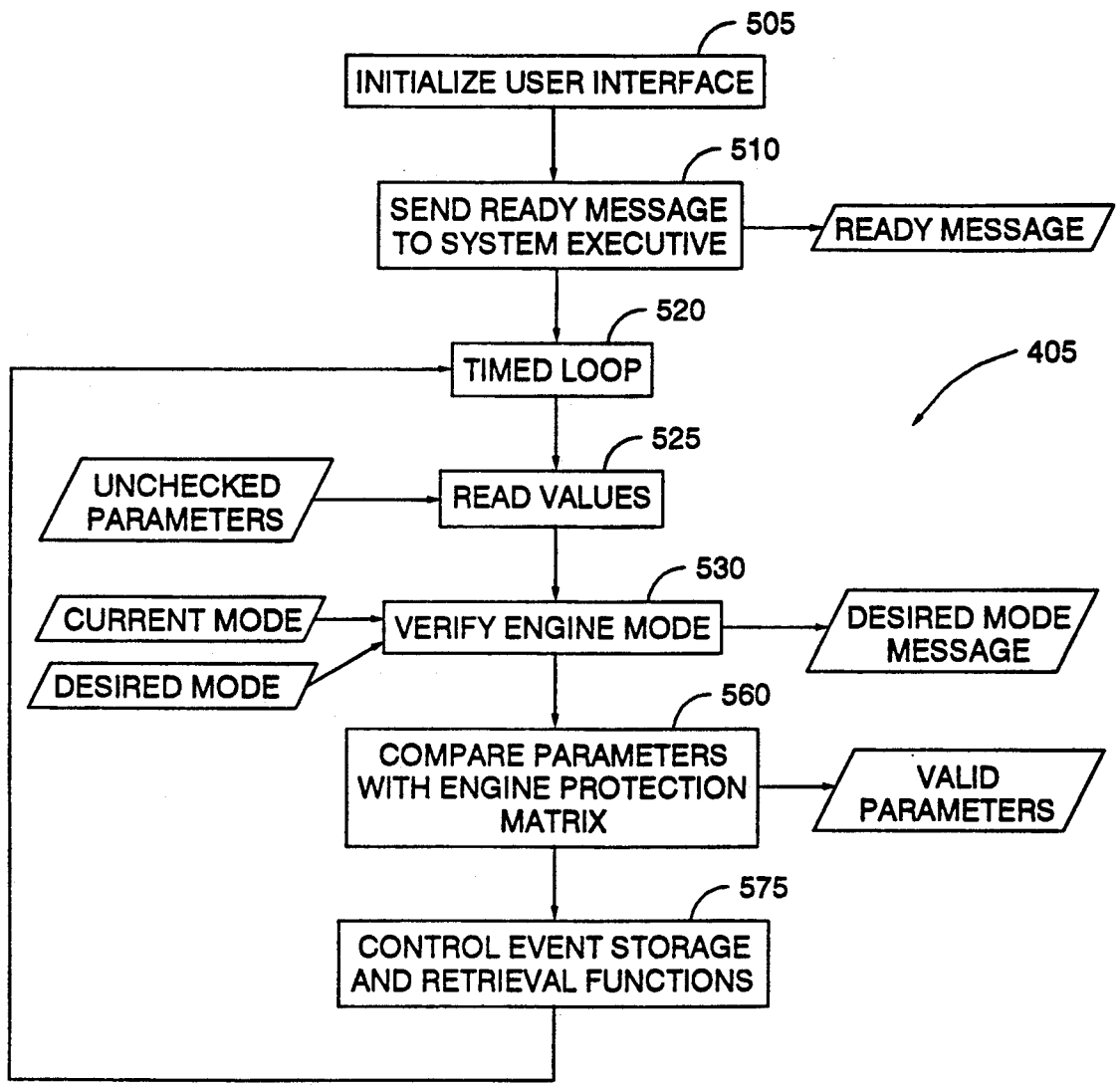
Fig_5_

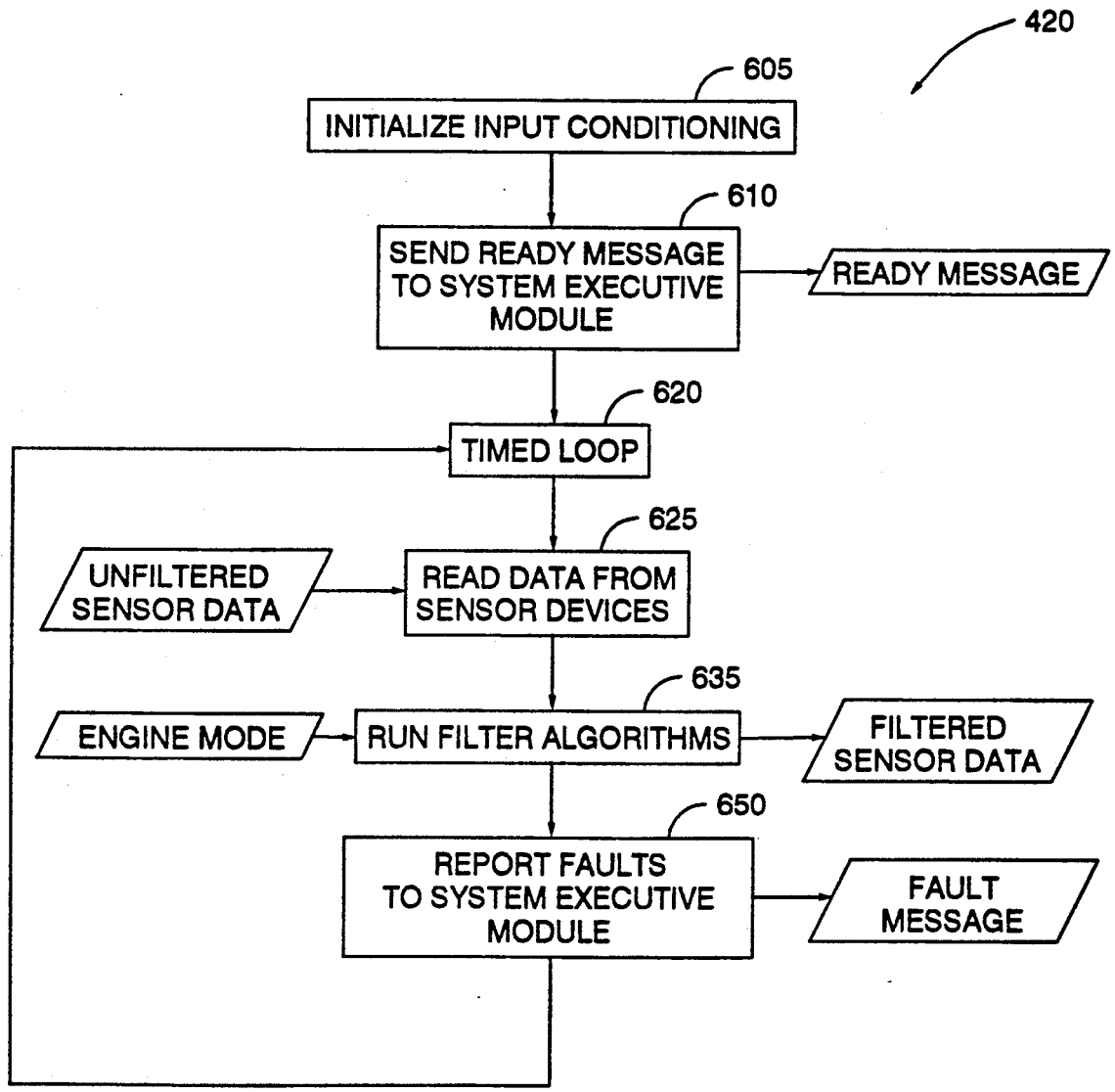
Fig_6_

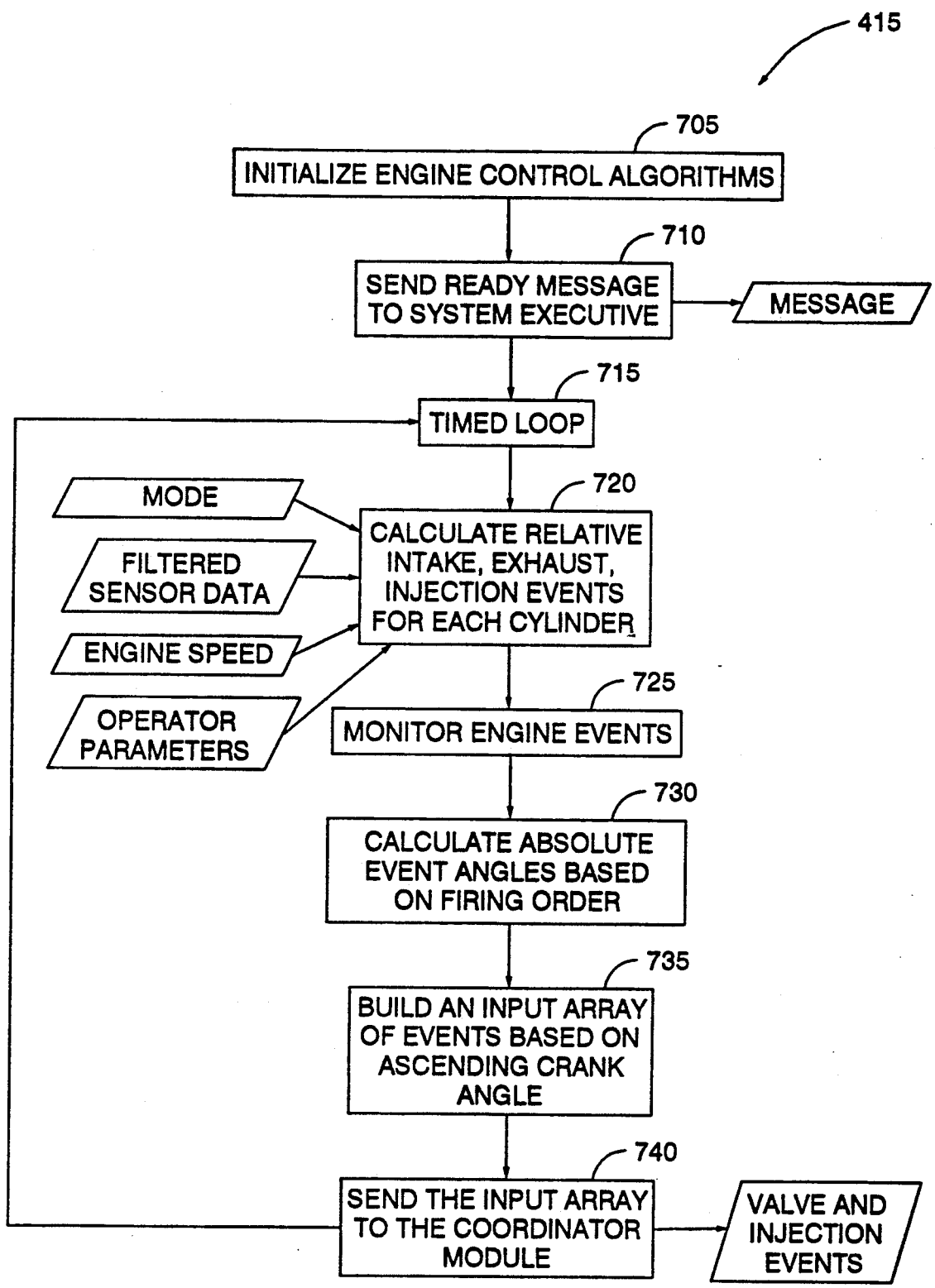
Fig_7_

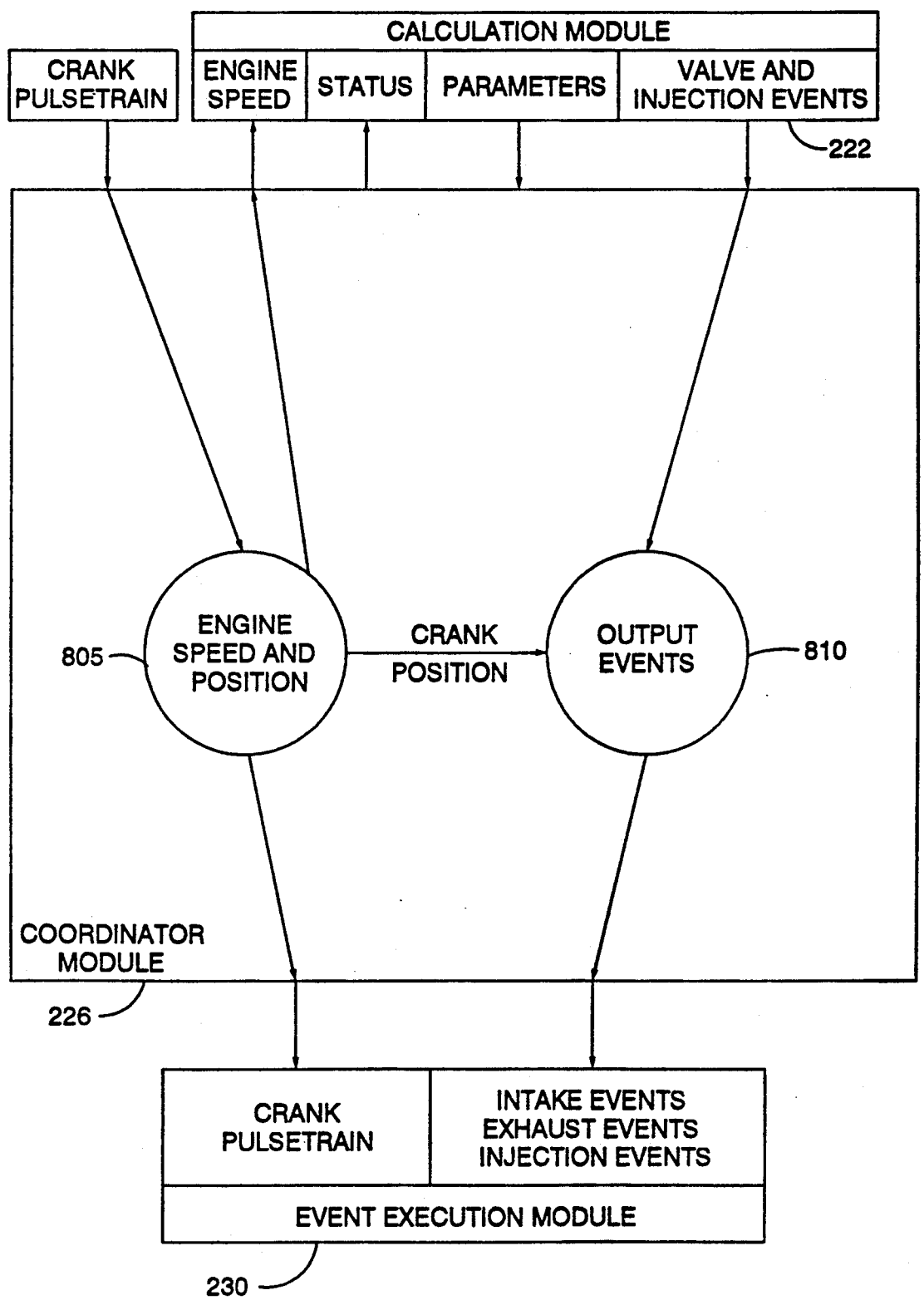
Fig_8_

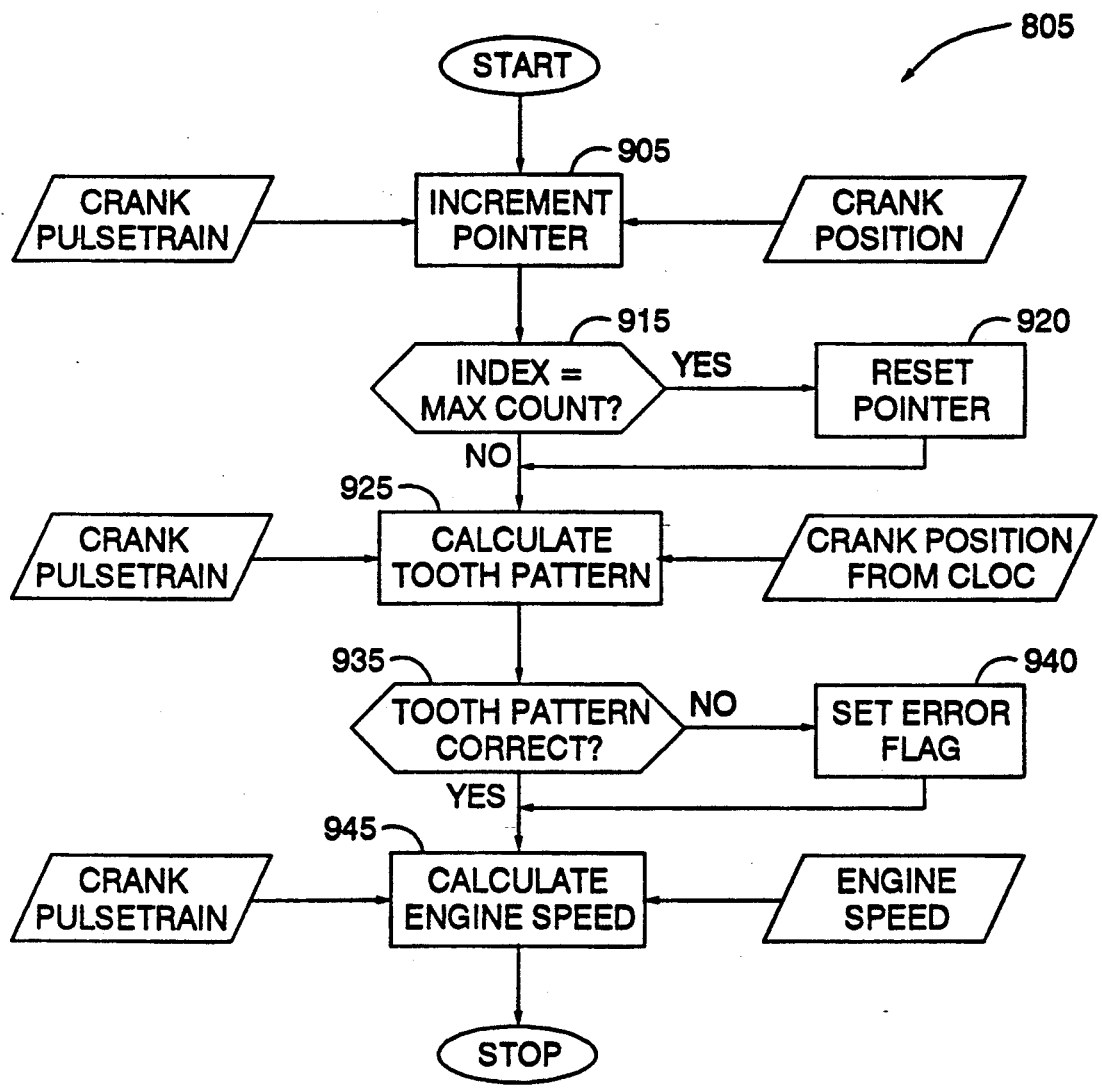
Fig_9_

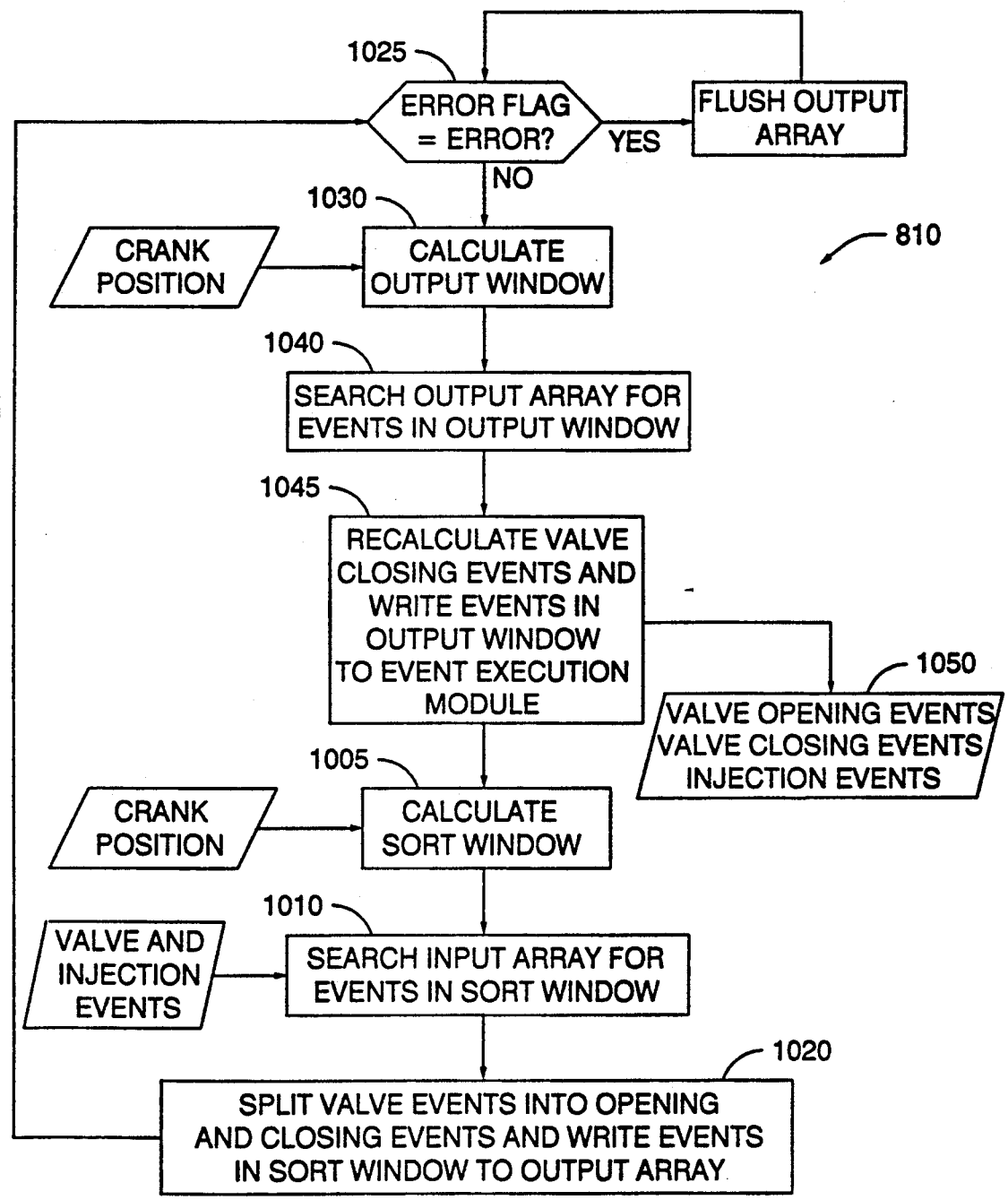
Fig_10_

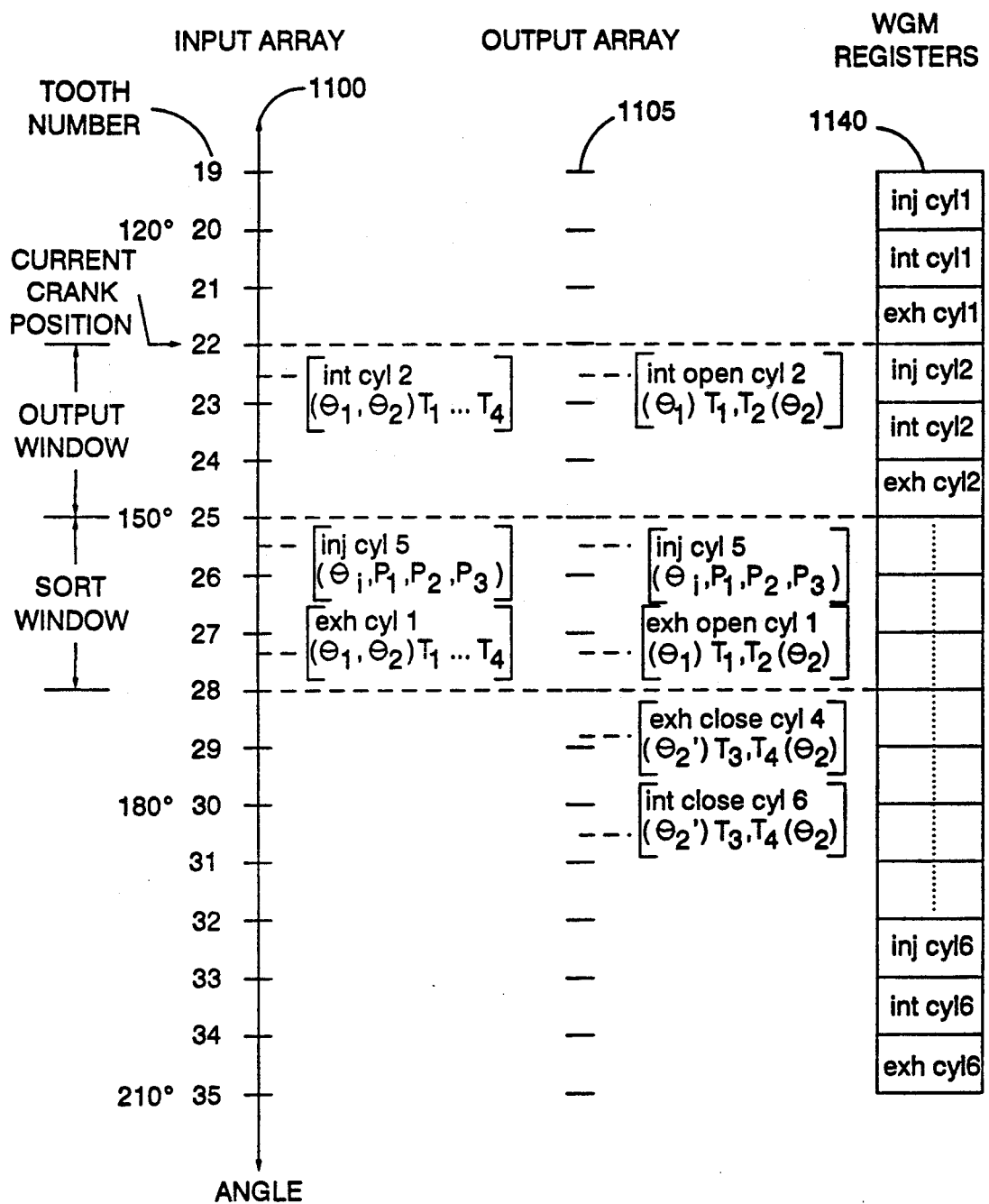
Fig_11_

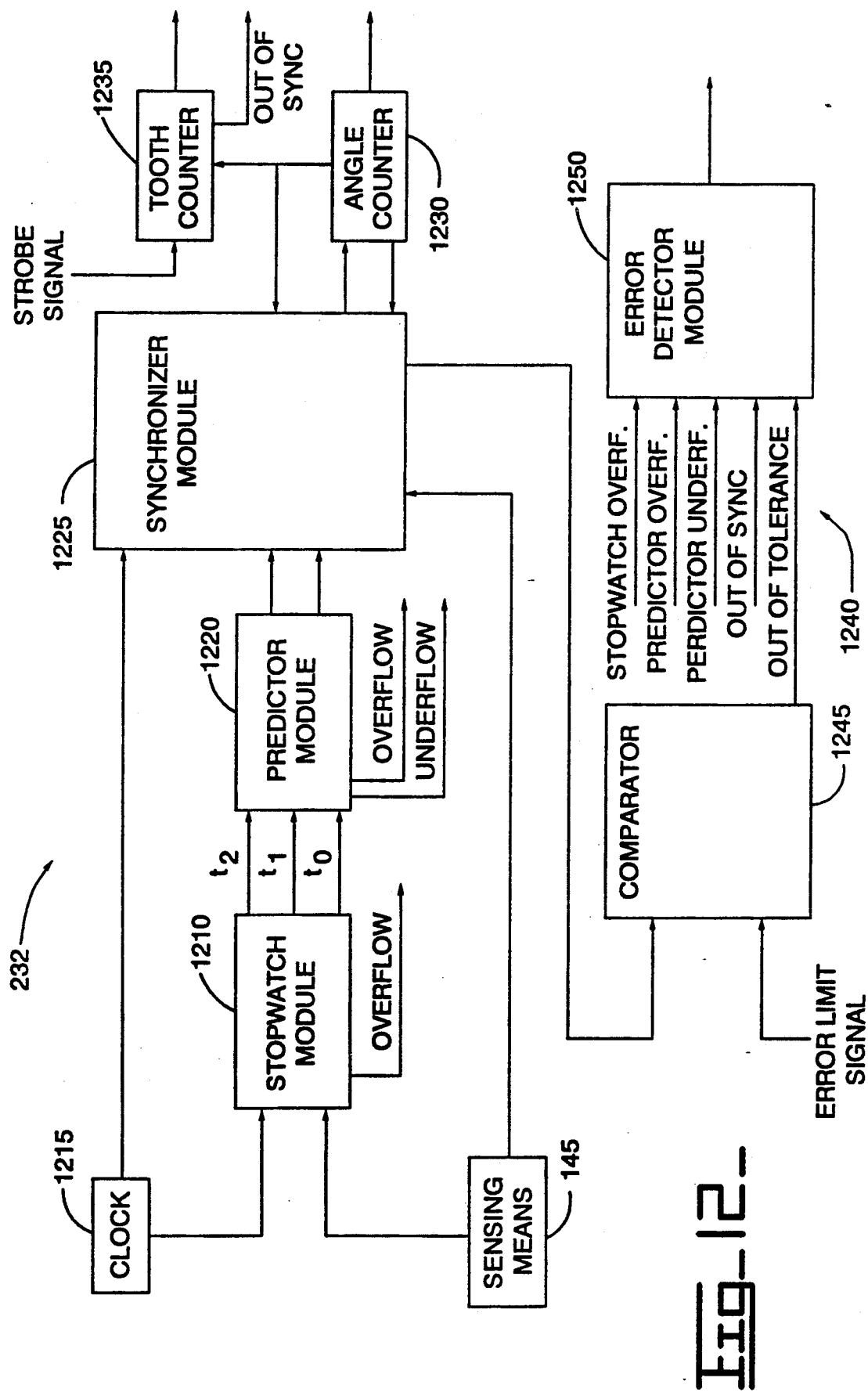
Fig_12

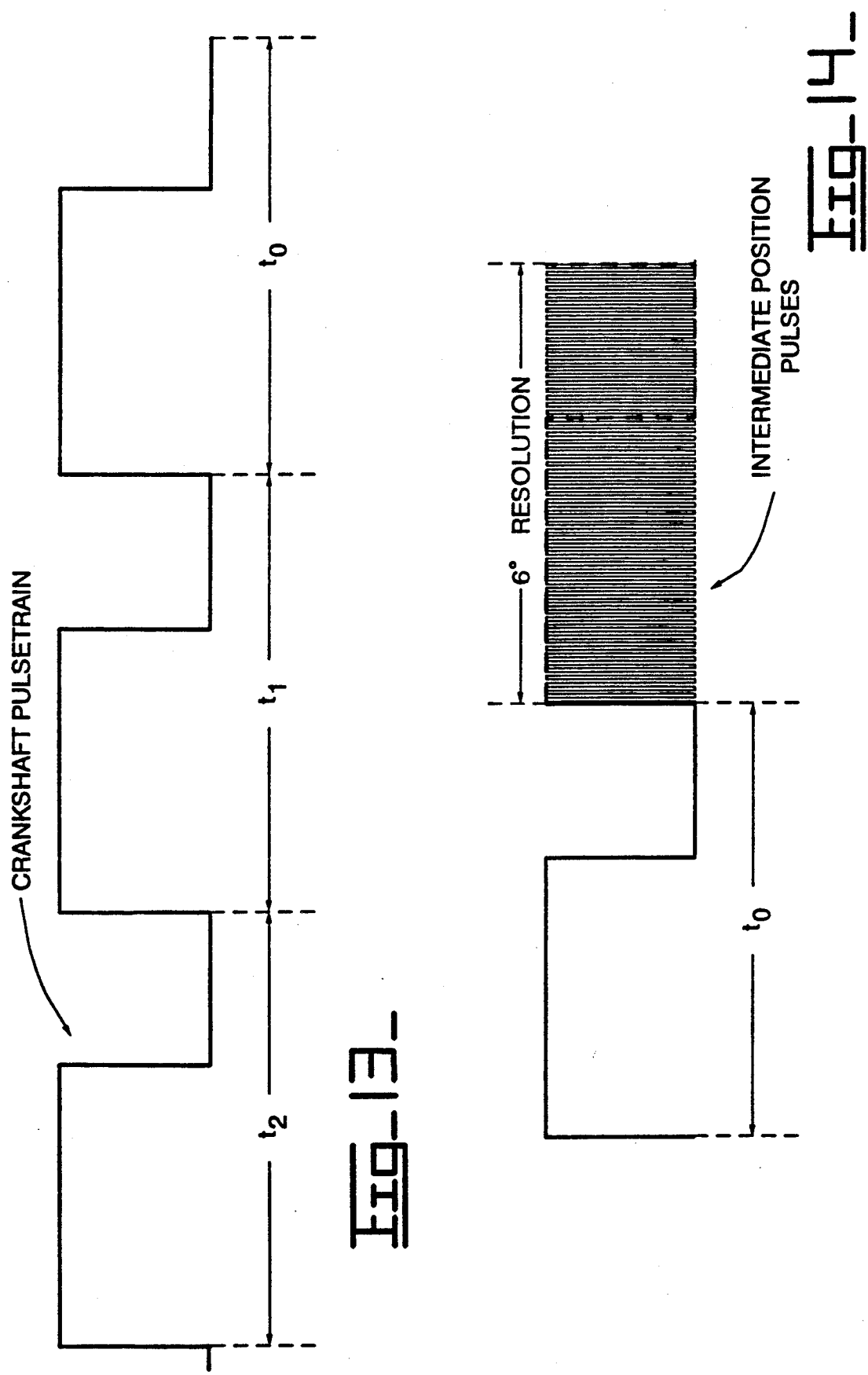

CONTROL SYSTEM FOR AN INTERNAL COMBUSTION ENGINE

DESCRIPTION

1. Technical Field

This invention relates generally to a control system for an internal combustion engine and, more particularly, to a control system which independently controls the intake, exhaust, and fuel injection of the engine.

2. Background Art

Control of internal combustion engines has received substantial attention in the past several decades. Compression and spark ignition engine designs have attempted to achieve increased flexibility of engine operation. A plethora of designs have been directed to independent intake and exhaust valve actuation and electronic fuel injection. Many of these designs are directed to electronic and feedback control for engine timing. Systems using independent valve actuation and electronic fuel injection have been conceived to perform engine operational modes not attainable by cam-based engines.

The above systems that use independent valve actuation and electronic fuel injection employ several methods for valve and injector actuation. Electronically or computer controlled solenoids, electromagnetic transducers and piezoelectric stacks are used for direct actuation. Alternatively, solenoids, transducers and/or stacks are used to control hydraulic valves which in turn actuate cylinder valves and injectors. The opening and closing of valves and injectors in camless systems is typically controlled as a function of an engine parameter such as angular position of the crankshaft. However, such prior systems are unable to fully control the flexible valve and injection events to achieve a desired engine mode operation on a per cylinder basis The present invention is directed to overcoming one or more of the problems as set forth above.

DISCLOSURE OF THE INVENTION

In one aspect of the present invention, a control system for an internal combustion engine is disclosed. The engine has a plurality of cylinders ($C_1$-$C_n$) and a rotatable Crankshaft. Each cylinder ($C_1$-$C_n$) has an electronically actuatable intake valve, exhaust valve and fuel injector. The control system includes a sensor which monitors the rotation of the crankshaft and responsively produces a crankshaft pulsetrain. A computer produces operator parameter signals. The operator parameter signals include one of a plurality of operating modes of the engine. A first microprocessor receives the crankshaft pulsetrain, responsively determines the speed of the engine and produces a signal representative of the determined engine speed. A second microprocessor receives the operator parameter signals and the engine speed signal, and responsively determines valve and injection events for each cylinder ($C_1$-$C_n$) to responsively achieve the one engine operating mode. The second microprocessor produces signals representative of the determined valve and injection events.

BRIEF DESCRIPTION OF THE DRAWINGS

For a better understanding of the present invention, reference may be made to the accompanying drawings in which:

FIG. 1 illustrates an internal combustion engine in connection with an embodiment of the present invention;

FIG. 2 illustrates a block diagram of a control system in connection with an embodiment of the present invention;

FIGS. 3(A-C) illustrate valve and injection waveforms in connection with an embodiment of the present invention;

FIG. 4 illustrates the data flow of a calculation module in connection with an embodiment of th present invention;

FIG. 5 illustrates a flow chart depicting a control of a operator interface module in connection with an embodiment of the present invention;

FIG. 6 illustrates a flow chart depicting a control of a input conditioning module in connection with an embodiment of the present invention;

FIG. 7 illustrates a flow chart depicting a control of the calculation module in connection with an embodiment of th present invention;

FIG. 8 illustrates the data flow of a coordinator module in connection with an embodiment of th present invention;

FIG. 9 illustrates a flow chart depicting one aspect of a control of the coordinator module in connection with an embodiment of the present invention;

FIG. 10 illustrates a flow chart depicting another aspect of a control of the coordinator module in connection with an embodiment of the present invention;

FIG. 11 illustrates an input array, output array and WGM registers in connection with an embodiment of the present invention; and FIG. 12 illustrates a block diagram of a crankshaft locator module in connection with an embodiment of the present invention;

FIG. 13 illustrates a crankshaft pulsetrain in connection with an embodiment of the present invention; and FIG. 14 illustrates a predictive period of a next produced pulse of the crankshaft pulsetrain in connection with an embodiment of the present invention.

BEST MODE FOR CARRYING OUT THE INVENTION

The instant embodiment of the present invention provides an electronic control for an engine which employs fully flexible valve and injection timing on a per cylinder basis. The control allows the ordering of valve and injection timing to be different from one cylinder or group of cylinders to the next. The electronic control of the present invention achieves complete flexibility of fuel injection timing and quantity. Moreover the electronic control permits fully independent inlet and exhaust valve opening and closing.

An embodiment of the present invention in conjunction with an engine 100 is shown with reference to FIG. 1. The engine includes a plurality of cylinders $C_1$-$C_n$. Each cylinder includes a piston 105 connected to a crankshaft 110, an intake valve 120, an exhaust valve 125, and an injector 130. Only a single intake, exhaust valve and injector are shown. However, it will become apparent to those skilled in the art that variations on the structure may be substituted.

To achieve independent control of each cylinder, an actuator 135 is provided for each engine valve and fuel injector. The actuators 135 may include electromechanical, electromagnetic, hydraulic, or piezoelectric devices which provide engine valve and injector actuation. Advantageously the actuators are powered and controlled by an electronic control 140. In the preferred embodiment, the actuators 135 comprise piezoelectric linear actuators. The actuators 135 utilize hydraulic amplification which amplifies the linear expansion of the piezoelectric actuator to provide the necessary amount of actuation.

Control of the engine operation is based on many factors. Specific engine structure, vehicle configuration and function, and engine variables such as cylinder pressure, exhaust temperature, crankshaft speed, angle, and torque are several examples. These and other variables can be monitored by commercially available electromagnetic and semiconductor sensors. The sensors provide the raw data to the electronic control which then processes the data along with programmed information to determine the proper timing of the cylinder events such as intake and exhaust valve actuation and fuel injection.

A sensing means 145 monitors the rotation of the crankshaft and responsively produces a crankshaft pulsetrain. The sensing means 145 includes a sensing wheel 150 which is connected to the engine crankshaft 110. The sensing wheel 150 has a plurality teeth spaced about a periphery. The sensing means 145 also includes a magnetic pick-up device 155 located adjacent the sensing wheel 150. The rotation of the crankshaft 110 causes the teeth of the sensing wheel 150 to pass by the magnetic pick-up device 155. The magnetic pick-up device 155 senses each tooth as it passes adjacent the device and responsively produces the crankshaft pulsetrain. Each pulse on the pulsetrain is indicative of a sensing wheel tooth.

The electronic control of the instant invention allows for each cylinder's intake valve, exhaust valve, and injector to be individually controllable. The ordering of cycle events for each cylinder is independently controllable on a per cylinder basis.

The electronic control of the present invention has direct application to diesel engines such as the Caterpillar Inc. Model 3176 or any compression or spark ignited internal combustion engine.

The electronic control of the present invention is shown in block diagram form with reference to FIG. 2. The electronic control 135 consists of the following modules: an I/O module 210, a processor module 220, an event execution module 230, a driver module 240, and a power module 250.

The block diagram of FIG. 2 depicts a complete working model of the present invention. The specific circuitry to carry-out the invention is a matter of design choice and is not critical to the present invention.

The I/O module 210 performs two tasks: to supply regulated power to the various sensors and components of the electronic control, and to condition the sensor signals. The I/O module 210 includes power circuitry 212 which converts supplied battery power to regulated +5 and +/−12 volts for the components and +8 volts for the sensors. A vehicle battery 218 with a voltage between 6 and 32 volts is utilized by the power circuitry 212 to provide the various voltage levels needed.

The I/O module 210 includes a conditioning circuitry 214 which receives the various sensing signals and conditions the sensing signals. For example, the conditioning may include analog-to-digital conversion and filtering operations. This type of signal conditioning is well known in the art and will not be further discussed.

The sensing signals include the crankshaft pulsetrain. The conditioning circuitry 214 may receive other sensing signals from various engine sensors such as: engine speed, throttle position, vehicle speed; coolant, oil, fuel, and inlet air temperature; coolant level; oil, fuel, atmospheric, and inlet manifold pressure; cruise control inputs, transmission inputs, vehicle air pressure, and valve position feedback may be additionally employed.

Shown in FIG. 2, an operator interface 216 provides for an operator to enter parameters to the control 140. The operator parameters are values which regulate various engine functions. The operator parameters may be used by the operator to enhance the performance of the engine. Further the operator interface allows a service technician to enter operator parameters to perform engine diagnostic tests. The operator interface 216 may include, for example, a computer with a video terminal and a touchpad or keyboard. The operator parameters may include such information as: fuel injection timing, exhaust valve timing, intake valve timing, and various engine operating modes such as engine starting, engine speed governing, engine braking, and cruise control. The operator interface 216 further provides for the operator parameters to be in the form of preprogrammed instructions. For example, the engine operating modes described in U.S. Pat. No. 5,117,790, issued on Jun. 2, 1992, assigned to Caterpillar Inc, may be implemented as preprogrammed instructions.

The processor module 220 consists of a calculation module 222, dual-port random access memory 224, and a coordinator module 226. The condition circuitry 214 delivers "critical-time" sensor data to 0 the coordinator module 226. A "critical-time" sensor data includes the crankshaft pulsetrain. In response to receiving the crankshaft pulsetrain, the coordinator module 226 calculates the actual engine speed. A signal representing the actual engine speed is delivered via the dual-port RAM 224 to the calculation module 222.

The conditioning circuitry 214 delivers "non-time" critical sensor data and the operator parameters to the calculation module 222. The "non-time" critical sensor data may include throttle position, vehicle speed, and various engine temperatures, etc. In response to receiving the sensor data, calculated engine speed and operator parameters, the calculation module 222 determines engine events. The engine events include valve events and injection events for each cylinder. For example, a valve event includes a valve opening angle and first valve closing angle for a respective engine valve. An injection event includes the injection angle and fuel injection duration(s) of a respective fuel injector. Each injection event is indicative of the optimum fuel quantity to be delivered to each cylinder. The engine event angles are determined relative to rotational position of the crankshaft 110. Once the engine events are determined by the calculation module 222, representative signals are delivered to the coordinator module 226 via the dual-port RAM 224.

The coordinator module 226 synchronizes the control system 140 relative to the rotational position of the crankshaft 110. The coordinator module 226 utilizes the crankshaft pulsetrain to synchronize the various modules. For example, in the preferred embodiment, the sensing wheel 150 has 60 equally spaced slots. The solid portion between the slots, referred to as teeth, are spaced about the wheel with two different widths. For example, three larger width teeth are placed about fifty-seven smaller width teeth in a predetermined pattern.

The predetermined pattern corresponds to the top-dead center (TDC) position of cylinder #1. Thus, detection of the predetermined pattern corresponds to a complete rotation of the crankshaft 110. Advantageously, the coordinator module 226 monitors the crankshaft pulsetrain and determines the rotational pattern of the sensing wheel 150. The coordinator module 226 generates a strobe signal in response to detecting two complete revolutions of the crankshaft (110). The strobe signal is used to synchronize the other system components.

In the preferred embodiment the calculation and coordinator modules are processor controlled. The calculation module 222 consists of a 32-bit microprocessor manufactured by Motorola as Model No. MC68020 with a floating point co-processor. The coordinator module 226 is a 32-bit microcontroller manufactured by Motorola as Model No. MC68332.

The event execution module 230 converts the computed engine event values into injection, intake, and exhaust waveforms to control the actuators 135. The event execution module 230 consists of a crankshaft locator module (CLOC) 232 and a waveform generation module (WGM) 234.

The CLOC 232 is a digital circuit that monitors the rotation of the crankshaft 110. For example, in response to receiving the the crankshaft pulsetrain to produces digital signals representative of the angular rotation of the crankshaft. The CLOC 232 is now described with reference to FIG. 12.

As shown in FIG. 12, the CLOC 232 is comprised of various modules including a stopwatch module 1210, predictor module 1220, synchronizer module 1225, angle counter module 1230, a tooth counter module 1235, and an error module 1240.

The stopwatch module 1210 receives the crankshaft pulsetrain and responsively determines the period of each pulse. Further, the stopwatch module 1210 receives a clock signal from a high frequency clock 1215. In the present example, the frequency of the clock signal is 3.69 MHz. The stopwatch module 1210 receives the crankshaft pulsetrain and samples each pulse with a sampling rate provided by the clock signal. Advantageously, the stopwatch module 1210 measures the period of the three most recent pulses of the crankshaft pulsetrain. Here, a period is defined as the time interval between the rising edges of consecutive pulses as shown in FIG. 13.

A pulse is representative of a predetermined amount of crankshaft rotation. In the present example, the period of the pulse represents 6° rotation of the crankshaft. The value of the pulse period is representative of the speed of the crankshaft rotation, i.e. engine speed. As shown, the three most recent pulses have values of $t_0$, $t_1$, $t_2$, respectively, where the last produced period has a value of $t_0$. Signals representative of the measured periods are delivered to the predictor module 1220.

The predictor module 1220 determines a value which is predictive of a period of the next pulse to be produced based on the measured period of the last three successive pulses of the crankshaft pulsetrain. For example, the predictor module 1220 receives signals corresponding to the measured periods $t_0$, $t_1$, $t_2$ and responsively determines the predictive value, P, based on the following equation:

$$P = 2.5*t_0 - 2.0*t_1 + 0.5*t_2,$$

This equation is derived from a second-order backward difference equation as follows:

$$P = \frac{1}{0!} t_o + \frac{1}{1!} (t_o - t_1) + \frac{1}{2!} [(t_o - t_1) - (t_1 - t_2)]$$

The value of the predicted period, P, is then divided by a predetermined value. In the present example, the predetermined value is 128. The integer result is referred to as the quotient and the fractional result is referred to as the remainder. Signals representative of the magnitude of the quotient and remainder are delivered to the synchronizer module 1225.

The synchronizer module 1225 receives a signal representative of the predictive value and produces an intermediate position signal. The intermediate position signal is an electronic pulse wherein each pulse is representative of a predetermined angular rotation of the crankshaft 110. For example, the pulse of the intermediate position signal represents a 0.05° rotation of the crankshaft 110. In the preferred embodiment, the synchronizer module 1225 receives the clock signal from the high frequency clock 1215 and produces the intermediate position signal in response receiving a predetermined number of pulses of the clock signal. The predetermined number of clock pulses is determinative of the magnitude of the quotient and remainder signals. Additionally, the synchronizer module 1225 utilizes values obtained from the angle counter 1230. For example, the angle counter 1230 produces a series of random numbers ranging from 0 to 127. Responsive to each pulse of the intermediate position signal, the angle counter 1230 delivers a signal representative of a distinct random number to the synchronizer module 1225.

Preferably, the synchronizer module 1225 produces each intermediate position signal with respect to the following steps:

(a) The synchronizer module 1225 compares the magnitude of remainder signal to a corresponding random number signal;
(b) if the remainder magnitude is greater than the corresponding random number, then a flag is set to "1";
(c) otherwise the flag is set to "0"; and
(d) the predetermined number of clock pulses, N, is then calculated by the following equation:

$$N = (Quotient + Flag)$$

The angle counter 1230 monitors the rotational position of the crankshaft 110. For example, the angle counter 1230 produces a crankshaft position signal in response to the intermediate position signal. The crankshaft position signal is a digital representation of the crankshaft angle. The crankshaft position signal has angular values ranging from 0° to 6°. Advantageously, the crankshaft position signal has an angular resolution of 0.05°. Thus, the angle counter 1230 receives a pulse of the intermediate position signal, increments the representative angular value of the crankshaft position by 0.05°, and produces the crankshaft position signal. Further, the angle counter 1230 generates a full count signal in response to receiving a predetermined number of pulses of the intermediate position signal from the synchronizer module 1225. As shown in FIG. 14 the predetermined number of pulses of the intermediate position signal approximates the predictive period, shown in phantom lines. In the present example, the predetermined number of pulses of the intermediate position signal is 128. Thus, the full count signal is associated with a predetermined sensing wheel tooth and represents a 6° rotation of the crankshaft.

The tooth counter 1235 monitors the rotational position of the crankshaft 110 by tracking the position of the sensing wheel 150. For example, the tooth counter 1235 receives the full count signal from the angle counter 1230 and counts the receipt of each signal. Responsively, the tooth counter 1235 produces a tooth count signal which is a digital representation of a predetermined tooth on the sensing wheel 145. In this manner the tooth counter tracks the rotational position of the sensing wheel and thus the rotational position of the crankshaft. In the present example, 120 occurrences of the full count signal corresponds to a 720° rotation of the crankshaft 110. Thus, the tooth count signal corresponds to angular values ranging from 0° to 720° at 6° increments. To insure that the tooth counter 1235 is synchronized with the sensing wheel 150, the tooth counter 1235 receives a strobe signal. The strobe signal represents a 720° rotation of the crankshaft 110. The strobe signal may be produced in response to the predetermined pattern of the crankshaft pulsetrain. An out-of-sync error signal is produced in the event that the tooth counter 1235 is not synchronized with the strobe signal.

The CLOC 1232 predicts the period of the next pulse of the crankshaft pulse train to be produced. Based on this information the CLOC 1232 can accurately determine the rotation of the crankshaft with high accuracy. Further, the CLOC 1232 is adapted to correct leading or lagging timing discrepancies.

A leading timing discrepancy may arise when the full count signal is generated before the next pulse of the crankshaft pulsetrain has been produced, e.g. the crankshaft 110 has not rotated 6°. If this condition occurs the synchronizer module 1225 delays the delivery of the intermediate position signal to the angle counter 1230, until the rising edge of the next pulse of the crankshaft pulsetrain is produced. Advantageously, the synchronizer module 1225 counts the number of clock pulses during this condition and responsively delivers a leading error signal to the error module 1240.

A lagging timing discrepancy may arise when the next pulse of the crankshaft pulsetrain is produced before the full count signal is generated, e.g. the crankshaft 110 has already rotated 6°. If this condition occurs the synchronizer module 1225 produces the intermediate position signal at the same frequency as the clock signal, until the full count signal is produced. Advantageously, the synchronizer module 1225 counts the number of crankshaft position pulses produced at the clock frequency and responsively delivers a lagging error signal to the error module 1240.

The error module 1240 receives the leading or lagging error signal and takes corrective action if necessary. The error module 1240 includes a comparator 1245 and an error detector module 1250. The comparator 1245 receives t he leading or lagging error signal from the synchronizer module 1225 and compares the value of the error signal to a calculated error limit value. A microprocessor or other processing device may calculate the error limit value. Further, the error limit value may be modified during engine operation. In the present example, the error limit value corresponds to 1.5°. The comparator 1245 produces an out-of-tolerance signal in response to the error signal being greater than the error limit.

The error detector module 1250 receives the stopwatch overflow, predictor overflow and underflow error signals, which are largely determinative of engine speed. For example, a stopwatch or predictor overflow error occurs when the speed of the engine is less than 7 rpm. A predictor underflow error occurs when the engine speed is greater than 28800 rpm, for example. The error detector module 1250 also receives the out-of-sync and out-of-tolerance signals. In response to any of these signal the error detector module 1250 produces an error signal.

Adverting back to FIG. 2, the coordinator module 226 continuously delivers the engine event data for each cylinder via a 96-pin connector 236 to the WGM 234. The event data is communicated on 32-bit address and data lines. In response to receiving the engine event data, the WGM 234 stores the data in registers until the monitored position of the crankshaft 110 agrees with the computed event angle. Responsively, the WGM 234 generates the specified intake, exhaust, and injection waveforms accordingly. The waveforms generated by the WGM 234 determine the magnitude and duration of voltage to be applied to the actuators 135. The waveforms associated with each cylinder are communicated to the driver module 240 via a respective AND gate 238. As shown the CLOC 232 is also connected to each respective AND gate 238.

Under normal conditions the CLOC 232 receives an enable signal from the coordinator module 226. However if an error occurs, the coordinator module 226 issues a disable signal to the CLOC 232. In response to receiving the disable signal, the CLOC 232 produces the error signal. The error signal is delivered to each of the AND gates, thus preventing the waveforms to be delivered to the driver module 240. An error signal is equivalent to a low logic level.

In the preferred embodiment the CLOC 232 and WGM 234 are implemented in digital circuitry and include field-programmable gate array I.C.'s manufactured by Xilinx. However as may be apparent to those skilled in the art, the CLOC 232 and WGM 234 may be implemented in discrete digital components or programmable software.

The driver module 240 includes drive circuitry 242 and diagnostic circuitry 244. The drive circuitry 242 receives the waveforms and responsively supplies electrical energy to the actuators. The drive circuitry 242 is shown as a single box, however, it may be readily apparent that there is a specific driver for each actuator 135. Each driver circuit is similar to that described by U.S. Pat. No. 5,130,598, issued Jul. 14, 1992, assigned to Caterpillar Inc.

The diagnostic circuitry 244 monitors "open-circuit" and "short-circuit" conditions of the actuators 135 and the associated wiring. If a diagnostic problem does occur, the diagnostic circuitry sends a signal to the event execution module 230. The event execution module 230 relays this information to the coordinator module 226 to initiate appropriate action.

The power module 250 includes a 750-volt supply 252 and a 13-volt supply 254. The battery 218 supplies the voltage necessary to operate the 750 and 13 volt power supplies. The 750-volt power supply 252 utilizes a voltage mode control having a power I.C. manufactured by Unitrode as Model No. UC3840. The UC3840 I.C. is configured in typical flyback fashion which is well known in the art. The 750-volt power supply 252 delivers the proper voltage to the drive circuitry 242 for driving the actuators 135. The 13-volt power supply 254 utilizes a current mode control having a power I.C. manufactured by Unitron as Model No. UC3843. The UC3843 provides a regulated 13-volts to the electrical components of the drive circuitry. Each of the power supply circuits are well known in the art and will not be further discussed.

FIG. 3 illustrates the waveforms required to operate the engine in the desired manner. As shown in FIG. 3A, the engine valve is effectively "ramped" open, held opened for a predetermined time period at the predetermined valve lift, and "ramped" closed. Ramping the valve opened and closed minimizes the impact of the valves moving to their limits. Shown in FIG. 3B, is the waveform required to operate the associated valve. The valve opening angle corresponds to $\theta_1$, and the first valve closing angle corresponds to $\theta_2$. $T_1$ and $T_2$ are the periods required to "ramp" the valve open and $t_3$ and $T_4$ are the periods required to "ramp" the valve closed. The values of $T_1$-$T_4$ are predetermined and are determined from the mechanics of the actuator 135.

FIG. 3C shows the injection waveform. The injection angle corresponds to $\theta_i$, where $P_1$ is the first period of injection, $P_2$ is the second period of injection, and $P_3$ is the period between the two injection durations. FIG. 3C shows a representative of split injection. If single injection is desirable, then the values for $P_2$ and $P_3$ are "0".

FIGS. 4 to 10 are flowcharts illustrating a computer software program for implementing the preferred embodiment of the present invention. The program depicted in these flowcharts is particularly well adapted for use with the microcomputer and associated components described above, although any suitable microcomputer may be utilized in practicing an embodiment of the present invention. These flowcharts constitute a complete and workable design of the preferred software program. The software program may be readily coded from these detailed flowcharts using the instruction set associated with this system, or may be coded with the instructions of any other suitable conventional microcomputer. The process of writing software code from flowcharts such as these is a mere mechanical step for one skilled in the art.

FIG. 4 illustrates the data flow of the calculation module 222. As shown, the calculation module 222 is comprised of four separate software modules including the user interface module 405, the system executive module 410, the engine algorithm module 415, and the input conditioning module 420.

The user interface module 405 receives the operator parameters from the operator interface 216. The operator parameters include the desired engine operating mode. Advantageously, the user interface module 405 monitors the operator parameters, and only communicates the parameters having valid values to the other software modules. The valid value correspond to values which are within the controlling parameters of the control 140. For example, the valid operator parameters are transmitted in the form of electronic signals to the system executive module 410. These electronic signals are referred to as messages. Although the user interface module 405 is shown as being part of the calculation module 222 it is to be understood that the user interface module 405 may be a portion of the operator interface module 216.

The system executive module 410 behaves as a finite state machine and is developed with modular code. The system executive module 410 utilizes the VRTX real-time operating system manufactured by Ready Systems. The operating system allows the system executive module 410 to supervise the various software modules in a multi-tasking environment. As shown, the system executive module 410 receives messages from the other modules. The messages may include operator parameters and error conditions. Each software module may process data in a distinct manner relative to an engine operating mode. Advantageously, the system executive module 410 dictates the engine operating mode for each software module. The engine operating modes may include a manual mode, a fuel governing mode, a split injection mode, an engine braking mode, and any other previously discussed mode.

The input conditioning module 420 receives the "non-time" critical sensor data and manipulates the data for use by the engine algorithm module 415. It should be noted that the input conditioning module 420 may reside in memory of the conditioning circuitry 214 or the processor module 220. Further, the input conditioning module 420 may manipulate data for use by the coordinator module 226.

The engine algorithm module 415 receives signals representing the current engine speed from the coordinator module 226, filtered sensor data from the input conditioning module 420, and the engine operating modes from the system executive module 410. Responsively, the engine algorithm module 415 calculates the valve and injection events for each cylinder.

As shown on FIG. 4, the status and message signals represents information relating to the operations of each software module. The information may include error values or calculated values, for example.

FIG. 5 refers to the software control of the user interface module 405. The operator interface module 505 is initialized at block 505. After which, the control delivers a ready message to the system executive module 410 in block 510. The ready message signifies that the user interface module 405 may begin processing. The control then passes to a timed loop, noted by block 520. In block 525 the operator parameters are read by the control. Again, the operator parameters may be produced manually or automatically. In block 530 the engine operating mode is verified. For example, the operator may request that the current engine operating mode be changed to a desired engine operating mode. The control delivers the desired engine operating mode to the system executive module 410. Responsively, the system executive module 410 determines if the desired engine operating mode can be accommodated. In block 560 the operator parameters are compared to valid values found in a look-up table. The look-up table may be a part of RAM or ROM. The operator parameters which correspond to the valid values of the look-up table are considered to be valid. The operator parameters which reside outside of the look-up table are substituted with valid values that yield safe engine operation, i.e. value which avoid valve/piston clashing. The valid parameters may then be delivered to the other software modules. Because the user interface module 405 may produce large amounts of data, well-known data acquisition algorithms are employed in block 575 to control the data flow.

The control of the input conditioning module 420 is illustrated by FIG. 6. The input conditioning module 420 is initialized in block 605. After which the control delivers a ready message to the system executive module 410, indicating that the input conditioning module is ready for processing. The control then transfers to a timed loop with a predetermined sampling period illustrated by block 620. In the block 625 the unfiltered sensor data is read by the control. Once the data is read, the data is then manipulated via well-known filtering algorithms in block 635. Block 650 establishes any faults that may occur from receiving erroneous data and issue an error flag accordingly.

FIG. 7 is a block diagram illustrating the control of the engine algorithm module 415. Block 705 initializes the engine control algorithms. Once the engine control algorithms are initialized, control then passes to block 710 where the algorithm delivers a ready message to the system executive module. The ready message signifies that the engine algorithm module 415 is able to proceed. Thereafter, the control enters into a timed loop with a predetermined sampling period illustrated by block 715. The algorithm receives various data in order to calculate the engine events shown in block 720. The data includes operator parameters from the user interface module 405, the engine operating mode from the system executive module 410, the filtered sensor data from the conditioning module 420, and the engine speed from the coordinator module 226. Responsively, the algorithm calculates the intake, exhaust, and injection events for each cylinder.

The valve events may be calculated empirically by well known linear equations based on crankshaft rotation and speed. However, to determine optimum placement of the valves it may be desirable to utilize "maps". For example, the processor and the associated memory may include "maps" which are used to control the valve and injection timing. For example, the maps may be stored within read-only memory or random-access memory. A plurality of predetermined valve timing values for various combinations of engine sensing values comprise the valve timing maps. Each engine operating mode may include a corresponding map. The values of the maps are determined empirically for an engine family by carrying out tests on an engine and compiling a schedule of optimum values of engine valve timing for various combinations of engine sensing values relative to an engine operating mode. Optimally the engine timing values will enable the engine to operate while meeting the EPA emissions standards. After this engine timing schedule has been completed, the values are then programmed into the various cells of read-only memory or random-access memory. Thus, the calculated engine valve timing events are applied to a map during operation of the vehicle, and the map will output events representative of a desired value enabling the engine operation to meet the EPA emissions standards.

The fuel injection events for each cylinder are calculated from fuel injection maps which are similar to that of the engine valve maps. The fuel injection maps have stored timing angle values for different engine speeds, such values again having been determined by testing for efficient engine operation. The actual engine speed signals are applied to the map with the corresponding fuel injection timing angle signals being produced. Such values again being predetermined to meet EPA standards for various different combinations of engine speed and timing within the operating ranges of these conditions. In the preferred embodiment, the fuel injection maps are similar to that provided by Caterpillar Inc.

engine Model No. 3176. However, it may become apparent to those skilled in the art that other fuel injection or engine valve timing maps may be readily substituted.

Depending upon the engine operating mode, the algorithm will determine the engine events for each cylinder. For example, under a manual mode the operator may determine all event angles for valve displacement and fuel injection. However, under a fuel governing mode the algorithm may employ a fuel control strategy based on the fuel injection maps utilizing PI feedback control based of a desired and actual engine speed to produce the injection event signal, for example.

The engine events are determined corresponding to relative timing angles, shown by block 720. The relative timing angles are determined from the power stroke at the top dead center position (TDC) of the associated cylinder. For example, all the engine events for cylinder #1 are determined relative to the power stroke (TDC) of cylinder #1. Thus, the determined engine event angles are relative to a respective cylinders TDC of the respective power stroke. Control then continues to block 725.

Block 725 monitors the engine events to avoid piston/valve clashing. For example, each engine event is compared to a matrix having value representative of safe engine operation. The matrix may be found in RAM or ROM. The engine event values residing outside the matrix are eliminated and substitute values are inserted. The monitored values are then passed to block 730 where the relative timing angles are converted to absolute timing angles. The following conversion is illustrated by Table 1.

TABLE 1

| Relative Timing Angles | Absolute Timing Angle |
|---|---|
| Top dead center Cyl #1 (power stroke) | 0 degrees |
| Top dead center Cyl #5 (power stroke) | 120 degrees |
| Top dead center Cyl #3 (power stroke) | 240 degrees |
| Top dead center Cyl #6 (power stroke) | 360 degrees |
| Top dead center Cyl #2 (power stroke) | 480 degrees |
| Top dead center Cyl #4 (power stroke) | 600 degrees |

Table 1 is based on a four-stroke engine having a firing order of 1, 5, 3, 6, 2, 4. As shown, the engine event angles are relative to the TDC of the respective cylinder's power stroke. Thus, event angles for cylinder #5 are referenced 120°. This process results in a table having the injection, intake, and exhaust events for each cylinder relative to the corresponding crank angles. The values of Table 1 are for exemplary purposes only and the actual values will depend on the firing order of the engine. Once the absolute event angles are determined, the process then continues to block 735.

In block 735 the algorithm arranges the engine events into an input array by crank angle order, i.e. the order of occurrence. The input array is arranged such that engine events are described for a full engine cycle, for example form 0 to 720°. FIG. 11 shows a portion of the input array 1100 is arranged relative to a predetermined tooth number on the sensing wheel. The predetermined tooth number gives an accurate representation of the crank angle. The input array is then delivered to the coordinator module 224 shown by block 740.

The data flow of the coordinator module 226 is shown generally by FIG. 8. Two software modules comprise the coordinator module 226. An engine speed calculation module 805 calculates the engine speed and crankshaft position. An event module 810 modifies the engine events produced by the calculation module 222 and delivers the engine events to the event execution module 230. For example, the engine speed calculation module 805 receives the crankshaft pulsetrain and responsibly calculates the engine speed and delivers a signal indicative of the engine speed to the calculation module 222. Additionally, the engine speed calculation module 805 determines the position of the crankshaft and delivers a signal representative thereof to the output event module 810. The event module 810 receives the engine events from the calculation module and delivers the engine events to the event execution module 230 at the appropriate crank position FIG. 9 shows generally the control of the engine speed calculation module 805. The engine speed calculation module comprises a multi-dimensional array having array indices which number from 0 to 119. Each index in the array corresponds to a predetermined tooth on the sensing wheel 150. A software pointer increments the array index by one at each pulse of the crankshaft pulsetrain, shown by block 905. In this manner the position or orientation of the crankshaft is monitored. The index of the crankshaft position array is then compared to a predetermined value identified by MAX-COUNT. In the present example the value of MAX-COUNT is 119. MAX-COUNT represents two complete crankshaft revolutions. If the crankshaft position or pointer value is 119, then the pointer is set to the zero index, denoted by block 920. In response to the crankshaft position array being reset to zero, the strobe signal is produced. Control then passes to block 925 where the algorithm determines the tooth pattern of the sensing wheel 150.

The tooth pattern is determined as follows. The algorithm measures the width and period of each pulse and calculates the corresponding tooth size. This result is then compared to the predetermined tooth pattern of the sensing wheel 150, shown by block 935. If the calculated tooth pattern does not coincide with the predetermined tooth pattern then an error flag is issued, shown by block 940. The error flag results in a signal which is delivered to the CLOC 232. The signals produced by the CLOC 232 is also monitored by the engine speed calculation module 805, as shown by block 925. Control continues to block 945 where the engine speed is calculated.

The engine speed is calculated by measuring the period of successive pulses. The measured period is inversely proportional to the engine speed. The engine speed is calculated with respect to the following formula:

$$Engine\ Speed = [(N/(T_{TOT})) \times 60/R]$$

N = Successive Pulses
$T_{TOT}$ = Total Period of Successive Pulses
R = The number of teeth on the sensing wheel The output event module 810 is shown generally by FIG. 10. The function of the output event module 810 is to transfer the engine events from the input array 1100 to the WGM registers 1110. To aid in better understanding, FIG. 10 will be discussed with reference to FIG. 11 The discussion begins with regard to block 1005 where the size of a sort window is calculated. Advantageously, the sort window size is calculated in response to the processing time of the coordinator module 226. As shown in FIG. 11, the size of the sort window is approximately 18°, which corresponds to 3 sensing wheel teeth. In block 1010 the algorithm searches the input array 1100 for the valve and injection events that reside within the sort window. Control then passes to block 1020 where each valve event is separated into a distinct valve opening and closing event. For example, the coordinator module 226 calculates a second valve closing angle $\theta_2'$, based on the first valve closing angle, $\theta_2$, and the valve ramping periods $T_3, T_4$. Thus, a valve event of a respective engine valve of an associated cylinder having the values of $(\theta_1, \theta_2, T_1, T_2, T_3, T_4)$ is separated into a distinct valve opening event with the values of $(\theta_1, \theta_2, T_1, T_2)$ and valve closing event with the values of $(\theta_2, \theta_2, T_3, T_4)$ Thereafter, the coordinator module 226 transfers the engine events, within the sort window, into the output array 1105. The event values are arranged in sequential order relative to the event angle. For example, the valve opening event is arranged with respect to the valve opening angle, $\theta_1$, the valve closing angle is arranged with respect to the valve closing angle, $\theta_2'$, and the injection event is arrange with respect to the injection angle, $\theta_i$. As shown in FIG. 11, the output array 1105 is similar to the input array 1100.

If a conflict occurs, i.e. engine events having identical calculated angular values, the sort process prioritizes the conflicting events so that the more critical event occurs first, and the less critical occurs later. Control then passes to block 1025 where an error flag is monitored to determine if an error has occurred If an error has occurred, then the values in the output array 1105 are deleted. Otherwise, control then passes to block 1030 where the size of the output window is calculated.

The output window size is calculated with respect to the processing time of the coordinator module 226. Once the output window is calculated, the control then passes to block 1040 where the algorithm scans the output array 1105 defined by the output window. Control then transfers to block 1045 where the second valve closing angle, $\theta_2'$, of each valve closing angle is recalculated in response to the current engine speed. Once the second valve closing angles, $\theta_2'$, have been recalculated, the algorithm then writes all engine events within the output window to the WGM registers 1110.

It should be noted that the values shown in the input array 1100 and the output array 1105 are for illustrative purposes only. The actual values are dependent upon the desired operating mode of the engine.

With reference to FIGS. 3B and 3C the engine events written to the WGM 234 registers have the following values:
valve open: $\theta_N$; $T_1$; $T_2$; $\theta_2$
valve close: $\theta_2'$; $T_3$; $T_4$; $\theta_2$
injection: $\theta_1$; $P_1$; $P_2$; $P_3$ The value of the first valve closing angle, $\theta_2$, is the emergency valve closing angle. For example, the angle associated with, $\theta_2$, represents the angle that the engine valve should be closed to avoid piston/valve clashing.

Industrial Applicability

The present invention yields independent control of each cylinder in a multi-cylinder, spark or compression internal combustion engine. Advantageously, the present invention determines the valve and fuel injection events to independently control each cylinder in the desired engine operating mode. The control of the cylinders may be different for separate groups of cylinders, or on a per cylinder basis. The cylinders can be controlled over an engine's complete speed and torque range to achieve different modes of engine operation as well. Control and optimization of power output is realizable on a per cylinder basis. Flexible timing facilitates improved engine braking capabilities. Furthermore, the electronic control uncomplicates split injection to reduce engine stress and noise.

Other aspects, objects and advantages of the present invention can be obtained from a study of the drawings, the disclosure and the appended claims.

We claim:

1. A control system for an internal combustion engine having a plurality of cylinders and a rotatable crankshaft, each cylinder having an electronically actuatable intake valve, exhaust valve and fuel injector, comprising:

sensing means for monitoring the rotation of the crankshaft and responsively producing a crankshaft pulsetrain;

operator interface means for producing operator parameter signals, the operator parameter signals including one of a plurality of engine operating modes;

coordinator means for receiving the crankshaft pulsetrain, responsively determining the speed of the engine and producing a signal representative of the determined engine speed;

calculation means for receiving the operator parameter signals and the engine speed signal, responsively determining valve and injection events for each cylinder to responsively achieve the one engine operating mode, and producing signals representative of the determined valve and injection events, said calculation means including a matrix having values representative of safe engine operation and wherein said calculation means compares the valve event values with the values of the matrix;

means for receiving the crankshaft pulsetrain, responsively determining the rotational position of the crankshaft, and producing digital signals indicative of the determined crankshaft position; and means for receiving the valve and injection event signals and the digital signals, and responsively delivering an event waveform signal to each of the electrically actuatable valves and fuel injectors at an appropriate rotational position of the crankshaft, the event waveform signals being representative of a voltage to be applied to the electrically actuatable valves and fuel injectors.

2. A control system, as set forth in claim 1, wherein a valve event includes a valve opening angle and a first valve closing angle of a respective engine valve, the valve opening angle and first valve closing angle being determined relative to the rotational position of the crankshaft.

3. A control system, as set forth in claim 2, wherein an injection event includes an injection angle and an injection duration period of a respective fuel injector, the injection angle being determined relative to the rotational position of the crankshaft.

4. A control system, as set forth in claim 3, wherein the calculation means includes an input array and means for arranging the valve and injection events into the input array, the valve and injection events being arranged in ascending order relative to the associated event angle.

5. A control system, as set forth in claim 4, wherein the coordinator means includes an output array, and means for searching the input array for the valve and injection events and responsively separating each valve event into a distinct valve opening event and valve closing event.

6. A control system, as set forth in claim 5, wherein the coordinator means includes means for calculating a second valve closing angle and arranging the valve opening, valve closing and injection events into the output array in ascending order relative to the associated event angle, the valve opening event including the valve opening and first valve closing angle, and the valve closing event including the first and second valve closing angle.

7. A control system, as set forth in claim 6, wherein the coordinator means includes means for searching the output array for the valve closing events and recalculating the second valve closing angle of each respective valve closing event in response to the engine speed, and delivering the associated valve and injection event signals to the event waveform generation means.

8. A method for controlling an internal combustion engine having a plurality of cylinders and a rotatable crankshaft, each cylinder having an electronically actuatable intake valve, exhaust valve and fuel injector, including the steps of:

monitoring the rotation of the crankshaft and responsively producing a crankshaft pulsetrain;

producing operator parameter signals, the operator parameter signals including one of a plurality of engine operating modes;

receiving the crankshaft pulsetrain, responsively determining the speed of the engine and producing a signal representative of the determined engine speed;

receiving the operator parameter signals and the engine speed signal, responsively determining valve and injection events for each cylinder to responsively achieve the one engine operating mode, comparing the valve event values with values representative of safe engine operation, and producing signals representative of the determined valve and injection events;

receiving the crankshaft pulsetrain, responsively determining the rotational position of the crankshaft, and producing digital signals indicative of the determined crankshaft position; and receiving the valve and injection event signals and the digital signals, and responsively delivering an event waveform signal to each of the electrically actuatable valves and fuel injectors at an appropriate rotational position of the crankshaft, the even waveform signals being representative of a voltage to be applied to the electrically actuatable valves and fuel injectors.

9. A method, as set form in claim 8, wherein a valve event includes a valve opening angle and a first valve closing angle of a respective engine valve, an injection event includes an injection angle and an injection duration period of a respective fuel injector, the valve opening angle, first valve closing angle and injection angle being determined relative to the rotational position of the crankshaft, and including the step of separating each valve even into a distinct valve opening event and valve closing event.

10. A method, as set forth in claim 9, including the steps of calculating a second valve closing angle and arranging the valve opening, valve closing and injection events relative to the associated event angle, the valve opening event including the valve opening and first valve closing angle, and the valve closing event including the first and second valve closing angle.

11. A method, as set form in claim 10, including the step of recalculating the second valve closing angle of each respective valve closing event in response to the engine speed.

* * * * *

UNITED STATES PATENT AND TRADEMARK OFFICE
CERTIFICATE OF CORRECTION

PATENT NO. : 5,201,296

DATED : April 13, 1993

INVENTOR(S) : John J. Wunning et al.

It is certified that error appears in the above-identified patent and that said Letters Patent is hereby corrected as shown below:

Claim 8, column 16, line 51, delete "even" and insert --event--.

Claim 9, column 16, line 63, delete "even" and insert --event--.

Signed and Sealed this

Eighteenth Day of January, 1994

Attest:

BRUCE LEHMAN

*Attesting Officer*          *Commissioner of Patents and Trademarks*